US010520655B2

(12) United States Patent
Chien et al.

(10) Patent No.: US 10,520,655 B2
(45) Date of Patent: Dec. 31, 2019

(54) GLARE REDUCING GLAZING ARTICLES

(75) Inventors: Bert T. Chien, St. Paul, MN (US); Yufeng Liu, Woodbury, MN (US); Kristopher J. Derks, Woodbury, MN (US); Raghunath Padiyath, Woodbury, MN (US); Stephen J. Strauss, Hastings, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 13/990,048

(22) PCT Filed: Dec. 6, 2011

(86) PCT No.: PCT/US2011/063379
§ 371 (c)(1),
(2), (4) Date: Aug. 15, 2013

(87) PCT Pub. No.: WO2012/078543
PCT Pub. Date: Jun. 14, 2012

(65) Prior Publication Data
US 2013/0321915 A1 Dec. 5, 2013

Related U.S. Application Data

(60) Provisional application No. 61/421,720, filed on Dec. 10, 2010.

(51) Int. Cl.
*G02B 5/30* (2006.01)
*G02B 27/28* (2006.01)
*B32B 17/06* (2006.01)

(52) U.S. Cl.
CPC .......... *G02B 5/3041* (2013.01); *B32B 17/064* (2013.01); *G02B 27/281* (2013.01)

(58) Field of Classification Search
CPC ...... G02B 5/3058; G02B 5/3033; G02B 5/30; G02B 27/28; G02B 1/111; G02B 5/285; F21S 48/114; B32B 27/00; B32B 5/16
(Continued)

(56) References Cited

U.S. PATENT DOCUMENTS 3,841,890 A 10/1974 Coaker
4,144,217 A 3/1979 Snelgrove
(Continued)

FOREIGN PATENT DOCUMENTS

JP S49-14507 2/1974
JP 09-43429 9/1998
(Continued)

OTHER PUBLICATIONS

Boese, "Chain Orientation and Anisotropies in Optical and Dielectric Properties in Thin Films of Stiff Polyimides", Journal of Polymer Science, Part B, 1992, vol. 30, pp. 1321-1327.
(Continued)

*Primary Examiner* — Wen Huang
(74) *Attorney, Agent, or Firm* — Jeffrey M. Olofson

(57) ABSTRACT

Glazing articles that reduce glare include a glazing substrate, and a reflective polarizing film article attached to the glazing substrate. The reflective polarizing film article includes a reflective polarizing film, and a reflection inhibitor layer. The reflective polarizing film articles reduce transmission of polarized light with a polarization block axis that is horizontal, and reduce horizontally polarized light to 90% or less of the horizontally polarized incident visible light. The reflective polarizing film may include a multi-layer film construction. The reflection inhibitor layer may include a tinted layer or an absorptive polarizer layer. Glazing units that reduce glare include at least one glazing substrate, at least one reflective polarizing film, and at least one reflection
(Continued)

inhibitor layer. The glazing substrate, reflective polarizing film, and reflection inhibitor layer may or may not be in contact with one another.

14 Claims, 4 Drawing Sheets

(58) Field of Classification Search
USPC ............ 359/485.01, 485.03, 485.07, 487.01, 359/487.02, 487.04, 487.05, 488.01, 601, 359/609, 614
See application file for complete search history.

(56) References Cited

U.S. PATENT DOCUMENTS

| | | | |
|---|---|---|---|
| 5,042,923 A * | 8/1991 | Wolf | G02F 1/1533 359/275 |
| 5,104,929 A | 4/1992 | Bilkadi | |
| 5,427,835 A | 6/1995 | Morrison | |
| 5,686,979 A | 11/1997 | Weber | |
| 6,049,419 A | 4/2000 | Wheatley | |
| 6,096,375 A | 8/2000 | Ouderkirk | |
| 6,185,039 B1 * | 2/2001 | Allen | E06B 9/24 359/352 |
| 6,296,927 B1 | 10/2001 | Jonza | |
| 6,368,699 B1 | 4/2002 | Gilbert | |
| 6,451,414 B1 | 9/2002 | Wheatley | |
| 6,459,514 B2 | 10/2002 | Jonza | |
| 6,559,903 B2 | 5/2003 | Faris | |
| 6,569,517 B1 * | 5/2003 | McGurran | G02B 5/205 359/582 |
| 6,610,356 B2 | 8/2003 | Kausch | |
| 6,697,195 B2 | 2/2004 | Weber | |
| 6,737,154 B2 | 5/2004 | Jonza | |
| 6,811,867 B1 | 11/2004 | McGurran | |
| 7,054,064 B2 | 5/2006 | Jiang | |
| 7,652,736 B2 | 1/2010 | Padiyath | |
| 7,740,470 B2 | 6/2010 | Merrill | |
| 7,755,829 B2 | 7/2010 | Powers | |
| 7,973,998 B2 | 7/2011 | Xue | |
| 2002/0180107 A1 | 12/2002 | Jackson | |
| 2004/0219338 A1 * | 11/2004 | Hebrink | B32B 27/08 428/202 |
| 2005/0134972 A1 | 6/2005 | Kugler | |
| 2005/0233131 A1 * | 10/2005 | Nishida et al. | 428/323 |
| 2006/0269731 A1 * | 11/2006 | Yoshikawa | B32B 17/10018 428/212 |
| 2006/0274218 A1 * | 12/2006 | Xue | G02F 1/133536 349/16 |
| 2008/0013051 A1 | 1/2008 | Glinski | |
| 2008/0075948 A1 | 3/2008 | Padiyath | |
| 2008/0206577 A1 * | 8/2008 | Gesell | G02B 1/105 428/447 |
| 2009/0053516 A1 * | 2/2009 | Davidovits | G02B 5/3033 428/339 |
| 2009/0168171 A1 | 7/2009 | Perkins | |
| 2009/0201583 A1 * | 8/2009 | Kamada et al. | 359/486 |
| 2009/0219603 A1 * | 9/2009 | Xue | 359/288 |
| 2011/0019280 A1 | 1/2011 | Lockridge | |
| 2011/0043727 A1 | 2/2011 | Bosl | |
| 2011/0102891 A1 | 5/2011 | Derks | |
| 2011/0103036 A1 | 5/2011 | Bosl | |

FOREIGN PATENT DOCUMENTS

| | | |
|---|---|---|
| JP | 2002-221610 | 8/2002 |
| JP | 2006-011281 | 1/2006 |
| JP | 2007-264038 | 10/2007 |
| JP | 2010-160504 | 7/2010 |
| KR | 10-1999-0072711 | 9/1999 |
| WO | WO 1996-19347 | 6/1996 |
| WO | WO 97/32226 | 9/1997 |
| WO | WO 1998-04938 | 2/1998 |
| WO | WO 2002-016976 | 2/2002 |
| WO | WO 2002-41045 | 5/2002 |
| WO | WO 2009-123921 | 10/2009 |
| WO | WO 2009-123928 | 10/2009 |
| WO | WO 2009-123949 | 10/2009 |
| WO | WO 2009-145939 | 12/2009 |

OTHER PUBLICATIONS

International Search Report for International Application No. PCT/US2011/063379, dated Jul. 9, 2012, 3 pages.

Kirk-Othmer, "Deuterium and Tritium to Elastomers, Polythers", Encyclopedia of Chemical Technology, 4th Ed., Wiley-Interscience Publication, 1993, vol. 8, pp. 652-661.

Land, "Dichroism and Dichroic Polarizers", Colloid Chemistry, J. Alexander, Ed. (Reinhold Publishing Corporation, New York), 1946, vol. 6, pp. 160-190.

Zang, "Giant anisotropies in the dielectric properties of quasi-epitaxial crystalline organic semiconductor thin films", American Institute of Physics, Aug. 12, 1991, vol. 59, No. 7, pp. 823-825.

* cited by examiner

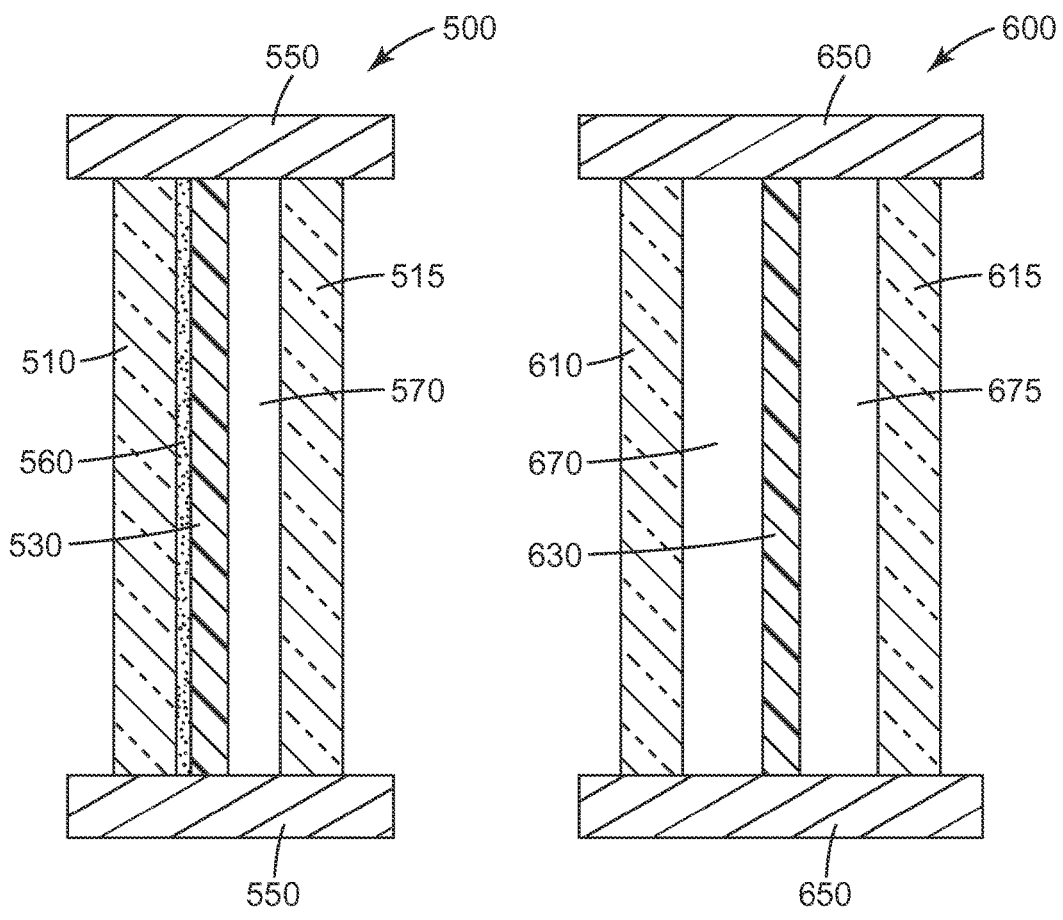

GLARE REDUCING GLAZING ARTICLES

FIELD OF THE DISCLOSURE

This disclosure relates to glazing articles, particularly glazing articles and units that reduce glare.

BACKGROUND

A variety of techniques can be used to reduce glare from incoming light through glazings such as windows. Many of these techniques, such as using curtains, blinds, drapes, or shutters may be undesirable because all of the incoming light is blocked. Therefore, if the windows of a room, corridor or other area in a house, office or other building are covered to reduce glare, artificial lighting will be needed in that room, corridor or area. Artificial lighting is not only less appealing aesthetically, it also requires energy, increasing the energy usage for that home or building.

SUMMARY

The present disclosure comprises glazing articles and units that reduce glare. The disclosed glazing articles comprise a glazing substrate, and a reflective polarizing film article attached to the glazing substrate. The reflective polarizing film article comprises a reflective polarizing film, and a reflection inhibitor layer. The reflective polarizing film articles reduce transmission of polarized light with a polarization block axis that is horizontal, and reduce horizontally polarized light to 90% or less of the horizontally polarized incident visible light. The reflective polarizing film may comprise a multi-layer film construction. The reflection inhibitor layer may comprise a tinted layer or an absorptive polarizer layer.

Also disclosed are glazing units. The disclosed glazing units comprise at least one glazing substrate, at least one reflective polarizing film, and at least one reflection inhibitor layer. The reflective polarizing film reduces transmission of polarized light with a polarization block axis that is horizontal, and the reflective polarizing film reduces the horizontally polarized light to 90% or less of the horizontally polarized incident visible light. The glazing substrate, reflective polarizing film, and reflection inhibitor layer may or may not be in contact with one another.

BRIEF DESCRIPTION OF THE DRAWINGS

The present application may be more completely understood in consideration of the following detailed description of various embodiments of the disclosure in connection with the accompanying drawings.

FIG. 5 shows a cross sectional view of a glazing article of this disclosure.

FIG. 6 shows a cross sectional view of a glazing article of this disclosure.

Figure 1:
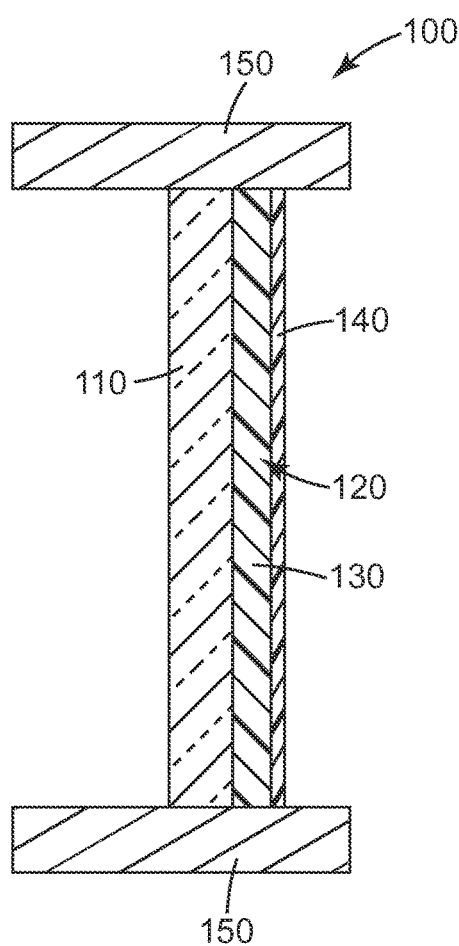
FIG. 1 shows a cross sectional view of a glazing article of this disclosure.

In the following description of the illustrated embodiments, reference is made to the accompanying drawings, in which is shown by way of illustration, various embodiments in which the disclosure may be practiced. It is to be understood that the embodiments may be utilized and structural changes may be made without departing from the scope of the present disclosure. The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Natural lighting is often very desirable for homes, offices and the like. Not only is natural lighting generally more aesthetically appealing than artificial lighting, the increased use of natural lighting helps to reduce energy use. One problem with the use of natural lighting is the presence of glare. Glare is a commonly encountered phenomenon, experienced whenever sunlight is present. Glare can be defined as the contrast lowering effect of stray light in a visual scene. Glare can be divided into two types: discomfort glare and disability glare. Discomfort glare refers to the sensation one experiences when the overall illumination is too bright, for example on a snowy field under a bright sun. Disability glare refers to the reduced visibility of a target due to the presence of a light source elsewhere in the field. It occurs when light from a glare source is scattered by the ocular media. This scattered light forms a veil of luminance which reduces the contrast and thus the visibility of the target. Both of these types of glare are an issue with windows that use natural light to illuminate a room, office, or other indoor space. As described above, glare can be eliminated through the use of curtains, blinds, drapes, shutters and the like, but such methods reduce or eliminate the desirable natural lighting. It is desirable to reduce or eliminate glare without completely blocking the transmission of visible light.

One method to reduce glare in glazing articles is to use an absorptive polarizer. Absorptive polarizers absorb polarized light of the proper polarity and let unpolarized light and light of the opposite polarity pass. A disadvantage of absorptive polarizers is that when they absorb light they generate heat. This heat generation can be undesirable because, for example when the glazing article is a window, it can cause warming of room containing the window. Also, in some instances the heating can cause thermal stresses or even cracks in the glazing article.

Another method that could be employed to reduce glare is the use of a reflective polarizer. Because the polarized light is reflected instead of absorbed, heating does not occur. A disadvantage of reflective polarizers, is that the level of reflection can be very high, even mirror-like, and this high level of reflection can be aesthetically unpleasing. Therefore, this disclosure provides glazing articles and units that incorporate a reflective polarizer together with a reflection inhibitor layer to control the level of reflection.

The term "optically transparent" as used herein refers to films or constructions that appear to be transparent to the naked human eye. The term "optically clear" as used herein refers to a film or article that has a high light transmittance over at least a portion of the visible light spectrum (about 400 to about 700 nanometers), and that exhibits low haze. An optically clear material often has a luminous transmission of at least about 90 percent and a haze of less than about 2 percent in the 400 to 700 nm wavelength range. Both the luminous transmission and the haze can be determined using, for example, the method of ASTM-D 1003-95.

In this disclosure, glazing articles and units are described which eliminate glare through the use of a reflective polarizing film and a reflection inhibitor layer. In some embodiments the reflective polarizing film and reflection inhibitor layer are in contact with each other to form a composite construction. This composite construction can be joined to one or more glazing substrates to form a glazing article. In other embodiments, the glazing substrate, reflective polarizing film, and reflection inhibitor layer are not in contact with each other. In still other embodiments, the reflective polarizing film and reflection inhibitor layer are in contact with each other to form a composite construction, and this composite construction is used together with at least one glazing substrate to form a glazing unit, but the composite construction is not in contact with the at least one glazing substrate.

The reflective polarizing film articles reduce glare because it has a polarization block axis that is horizontal. This means that the reflective polarizing film article blocks the transmission of horizontally polarized light. Another way of stating this is to say that the reflective polarizing film article has a polarization pass axis that is vertical. This means that vertically polarized light is able to pass through the reflective polarizing film article. Most of the light that is reflected from horizontal surfaces, such as for example the surface of a lake or the surface of a parking lot, is horizontally polarized. Scattered light, such as from Rayleigh scattering in the sky, is polarized very much like it was reflected, and therefore is also horizontally polarized. Therefore, the reflective polarizing film article with a polarization block axis that is horizontal is effective at blocking reflected and scattered light that is horizontally polarized, but permits vertically polarized light and unpolarized light to pass through. In some embodiments, the reflective polarizing film articles of this disclosure reduce the horizontally polarized light to 90% or less of the horizontally polarized incident visible light. In many embodiments, the reduction of horizontally polarized light is much greater. In some embodiments, the reflective polarizing film articles of this disclosure reduce the horizontally polarized light to 80%, 70%, 60%, 50%, 40%, 30%, or even 20% or less of the horizontally polarized incident visible light.

The reduction in glare through the blocking of horizontally polarized light is achieved without completely blocking the incoming visible light. This means that not only can objects be viewed more clearly through glazing constructions of this disclosure because of the reduction of glare (disability glare), but also desirable glare-reduced natural light can pass through the glazing constructions of this disclosure to provide natural illumination because discomfort glare is reduced.

The glazing articles of this disclosure permit a non-zero amount of visible light to pass through, that is to say that the % Transmission for visible light is greater than 0%. In some embodiments, the glazing articles of this disclosure permit a % Transmission of from 5% to 50%.

Disclosed herein are articles comprising a glazing substrate and a reflective polarizing film article attached to the glazing substrate. The reflective polarizing film article is a composite construction comprising a reflective polarizing film, and a reflection inhibitor layer.

A wide variety of glazing substrates are suitable in the glazing articles of this disclosure. In some embodiments, a single glazing substrate is present, in other embodiments multiple glazing substrates are present. In some embodiments the reflective polarizing film article is attached to an exterior surface of a glazing substrate, and in other embodiments, the reflective polarizing film article is located between two glazing substrates.

Suitable glazing substrates are at least optically transparent, and may be optically clear. Examples or suitable substrates include, for example, windows. Windows may be made of a variety or different types of glazing substrates such as a variety of glasses or from polymeric materials such as polycarbonate or polymethyl methacrylate. In some embodiments, the window may also comprise additional layers or treatments. Examples of additional layers include, for example, additional layers of film designed to provide tinting, shatter resistance and the like. Examples of additional treatments that may be present of windows include, for example, coatings or various types such as hardcoats, and etchings such as decorative etchings.

In some embodiments, the glazing substrate is a single pane substrate and the reflective polarizing film article is attached to an exterior surface of the single pane glazing substrate. In other embodiments, the glazing substrates is a double pane glazing substrate. In these substrates, the two panes of glazing are parallel to each other and may be in contact with one another and adhered together or they may be separated by a space. In some insulated windows, the space is evacuated to provide a "dead space" between the two panes of glazing. Some safety windows have two panes adhered to each other with a layer of film between the two panes of glazing to provide, for example, shatter resistance.

In some embodiments, the reflective polarizing film article is located between two glazing substrates. In these embodiments, the reflective polarizing film article is typically attached to at least one of the glazing substrates and in some embodiments to both glazing substrates. Insulated windows can be prepared, for example, by providing a "dead space" between the glazing substrate to which the reflective polarizing film article is attached and the second glazing substrate. In other embodiments, a safety window can be prepared where the reflective polarizing film article also functions a reinforcing film layer between the two glazing substrates. Additional films and/or coatings can also be included in the glazing articles.

A wide variety of reflective polarizing films are suitable for use in the reflective polarizing film articles of this disclosure. Examples of suitable reflective polarizing films include a variety of multi-layer constructions including multi-layer reflective polarizing films, cholesteric liquid crystal films, wire grid polarizer films, and the like. Multi-layer reflective polarizing films are particularly suitable and are described in greater detail below.

Examples of cholesteric liquid crystal reflective polarizer films are described in U.S. Pat. No. 7,652,736 (Padiyath et al.). Cholesteric liquid crystal reflective polarizer films include at least one layer comprised of cholesteric liquid crystal compounds. Cholesteric liquid crystal compounds generally include molecular units that are chiral in nature (e.g., molecules that do not possess a mirror plane) and molecular units that are mesogenic in nature (e.g., molecules that exhibit liquid crystal phases) and can be polymers. Cholesteric liquid crystal compositions may also include achiral liquid crystal compounds (nematic) mixed with or containing a chiral unit. Cholesteric liquid crystal compositions or materials include compounds having a cholesteric liquid crystal phase in which the director (the unit vector that specifies the direction of average local molecular alignment) of the liquid crystal rotates in a helical fashion along the dimension perpendicular to the director. Cholesteric liquid crystal compositions are also referred to as chiral nematic liquid crystal compositions.

A multilayer wire-grid polarizer film includes a stack of thin film layers disposed over a substrate, including a wire-grid array of elongated metal elements having lengths longer than a wavelength of the light and a period less than half the wavelength of the light. One of the layers can include a thin film layer with a refractive index greater than a refractive index of the substrate. One of the thin film layers can include a dielectric array of non-metal elements. Wire grid polarizer films can be made, for example, as described in US Patent Publication No. 2009/0168171.

A number of multi-layer polymeric films suitable for use as reflective polarizing films are not easily characterized as a class of films. Examples of these multi-layer films include ones that may be prepared using techniques such as spin coating (e.g., as described in Boese et al., J. Polym. Sci.: Part B, 30:1321 (1992)) for birefringent polyimides, and vacuum deposition (e.g., as described by Zang et. al., Appl. Phys. Letters, 59:823 (1991)) for crystalline organic compounds. The latter technique is particularly useful for certain combinations of crystalline organic compounds and inorganic materials.

One particularly suitable class of reflective polarizer films are multi-layer optical films that function as reflective polarizer films. These multi-layer optical films are described, for example, in PCT Publication Nos. WO 96/19347 (Jonza et al.) and WO 98/04938 (Weber et al.). Multi-layer optical films as used in the present disclosure exhibit relatively low absorption of incident light, as well as high reflectivity for off-axis light rays.

An exemplary multi-layer optical film of the present invention has alternating layers of at least two materials. At least one of the materials has the property of stress induced birefringence, such that the index of refraction (n) of the material is affected by the stretching process. The difference in refractive index at each boundary between layers will cause part of incoming light rays to be reflected. By stretching the multi-layer stack over a range of uniaxial to biaxial orientation, a film is created with a range of reflectivities for differently oriented plane-polarized incident light. The multi-layer stack can thus be made useful as a reflective polarizer.

Suitable multi-layer optical films exhibit a Brewster angle (the angle at which reflectance goes to zero for light incident at any of the layer interfaces) which is very large or is nonexistent for the polymer layer interfaces. In contrast, known multi-layer polymer films exhibit relatively small Brewster angles at layer interfaces, resulting in transmission of light and/or undesirable iridescence. The multi-layer optical films useful in the present disclosure, however, allow for the construction of polarizers whose reflectivity for p polarized light decrease slowly with angle of incidence, are independent of angle of incidence, or increase with angle of incidence away from the normal. As a result, multi-layer stacks having high reflectivity for polarized light over a wide bandwidth, and over a wide range of angles can be achieved.

The relationships between the indices of refraction in each film layer to each other and to those of the other layers in the film stack determine the reflectance behavior of the multi-layer stack at any angle of incidence, from any azimuthal direction. The principles and design considerations described in PCT Publication No. WO 96/19347 (Jonza et al.) can be applied to create multi-layer stacks having the desired optical effects for a wide variety of circumstances and applications. The indices of refraction of the layers in the multi-layer stack can be manipulated and tailored to produce the desired optical properties.

The multi-layer stack can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multi-layer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multi-layer optical films concerned with the visible and the near infrared wavelengths, a quarterwave stack design results in each of the layers in the multi-layer stack having an average thickness of not more than 0.5 micrometers.

One way to produce a multi-layer reflective polarizer is to uniaxially stretch a multi-layer stack. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

In some embodiments, the average reflectivity for unpolarized visible light incident on the surface of the multi-layer reflective polarizing film layer is at least 20%. In other embodiments, the average reflectivity of unpolarized visible light incident on the surface of the reflective polarizing film layer is at least 40%.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

With the design considerations described in the above mentioned PCT Publication No. WO 96/19347 (Jonza et al.), one of ordinary skill will readily appreciate that a wide variety of materials can be used to form multi-layer reflective polarizer films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline, or liquid crystalline material, preferably a polymer. The second material, in turn, may be crystalline, semi-crystalline, or amorphous. The second material may have a birefringence opposite to or the same as that of the first material. Or, the second material may have no birefringence. It should be understood that in the polymer art it is generally recognized that polymers are typically not entirely crystalline, and therefore in the context of the present invention, crystalline or semi-crystalline polymers refer to those polymers that are not amorphous and includes any of those materials commonly referred to as crystalline, partially crystalline, semi-crystalline, etc. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate (PET), polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN called CoPEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates called CoPET (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The CoPEN described may also be a blend of pellets where at least one component is a polymer based on naphthalene dicarboxylic acid and other components are other polyesters or polycarbonates, such as a PET, a PEN or a CoPEN.

Particularly desirable combinations of layers include PEN/CoPEN, PET/CoPEN, PEN/CoPET, PET/CoPET, PEN/Acrylate, PEN/SAN, PET/Acrylate, PEN/sPS, PET/sPS, PEN/aPS, PET/aPS, PEN/ESTAR, and PET/ESTAR, where "PEN", "CoPEN", "PET", "CoPET" are described above, Acrylate is a poly(meth)acrylate, ESTAR is polycyclohexanedimethylene terephthalate commercially available from Eastman Chemical Co., SAN is a styrene acrylonitrile copolymer commercially available from Dow Chemical, and aPS and sPS are atactic polystyrene and syndiotactic polystyrene, respectively.

The number of layers in the film is selected to achieve the desired optical properties using the minimum number of layers for reasons of film thickness, flexibility and economy. The number of layers is generally less than 10,000, typically less than 5,000, and even more typically less than 2,000.

The ability to achieve the desired relationships among the various indices of refraction (and thus the optical properties of the multi-layer film) is influenced by the processing conditions used to prepare the multi-layer film. In the case of organic polymers which can be oriented by stretching, the films are generally prepared by co-extruding the individual polymers to form a multi-layer film and then orienting the film by stretching at a selected temperature, optionally followed by heat-setting at a selected temperature. Alternatively, the extrusion and orientation steps may be performed simultaneously. The film is typically stretched substantially in one direction (uniaxial orientation).

The pre-stretch temperature, stretch temperature, stretch rate, stretch ratio, heat set temperature, heat set time, heat set relaxation, and cross-stretch relaxation are selected to yield a multi-layer film having the desired refractive index relationship. These variables are interdependent; thus, for example, a relatively low stretch rate could be used if coupled with, e.g., a relatively low stretch temperature. It will be apparent to one of ordinary skill how to select the appropriate combination of these variables to achieve the desired multi-layer film. In general, however, a stretch ratio in the range from 1:2 to 1:10 (more typically 1:3 to 1:7) is suitable.

The glare reducing glazing articles and units of this disclosure also comprise a reflection inhibitor layer. This reflection inhibitor layer reduces the amount of reflected unpolarized visible incident light. In some uses, where, for example, the glazing substrate is a window, it may be desirable to have the reflection inhibitor layer on the surface that faces in the inside of the room such that when a person looks out the window he or she does not see his or her reflection. In other uses, it may be desirable to have the reflection inhibitor layer on the surface that faces in the outside environment to manage the exterior reflection. In some embodiments, the reflection of unpolarized visible light incident on the surface of the reflection inhibitor layer is less than 30%. In other embodiments, the reflection of unpolarized visible light incident on the surface of the reflection inhibitor layer is less than 10%.

A wide variety of reflection inhibitor layers are suitable for use in the reflective polarizing film articles of this disclosure. Examples of suitable reflection inhibitor layers included tinted layers and absorptive polarizer layers.

Suitable tinted layers include, for example, coatings, films, tinted glazing substrates or combinations thereof. In some embodiments, the tinted layer comprises a coating applied to the multi-layer reflective polarizer film. In other embodiments, the reflection inhibitor layer may comprise a film or a glazing substrate, and the film or glazing substrate may have one or more coatings. The film or glazing substrate may or may not be tinted. Additionally, one or more of the coatings may or may not be tinted. In this way the inhibition of reflection can be controlled to the level suitable for the desired application.

Examples of suitable coatings that may be applied either to the multi-layer reflective polarizing film or to another film or substrate, include, for example, pigments, dyes or visible light absorbing particles in a cured polymeric binder and surface metallization layers such as are described in PCT Publication No. WO 02/41045 (McGurran et al.).

Particularly suitable tinted coatings are hardcoat layers that contain light absorbing particles. Hardcoats are well understood in the optical industry as coatings that provide scratch and abrasion resistance to optical articles. These hardcoats typically contain inorganic oxide particles, e.g., silica, of nanometer dimensions dispersed in a binder precursor resin matrix, and sometimes are referred to as "ceramers". For example, U.S. Pat. No. 5,104,929 (Bilkadi) describes UV curable ceramer coatings containing colloidal silica particles dispersed in an acrylic binder, wherein the acrylic binder is a protic group-substituted ester or amide of an acrylic acid. These hardcoat compositions can be modified with light absorbing particles to produce tinted hardcoats. Examples of suitable light absorbing particles include carbon black particles, dyes and pigments.

The tinted layer may be different colors. Typical colors include, but are not limited to, grey, black, blue, red, green, gold, yellow, silver, chrome, pink, purple, or combinations thereof.

In some embodiments, the tinted layer or tinted hardcoat layer also includes infrared absorbing nanoparticles in addition to visible light absorbing particles or tinting agents. Layers containing infrared absorbing nanoparticles are described, for example, in US Patent Publication No. 2008/0075948 (Padiyath et al.). The infrared light absorbing nanoparticle layer can include a plurality of metal oxide nanoparticles. A partial listing of metal oxide nanoparticles includes tin, antimony, indium and zinc oxides and doped oxides. In some embodiments, the metal oxide nanoparticles include, tin oxide, antimony oxide, indium oxide, indium doped tin oxide, antimony doped indium tin oxide, antimony tin oxide, antimony doped tin oxide or mixtures thereof. In some embodiments, the metal oxide nanoparticles include tin oxide or doped tin oxide and optionally further includes antimony oxide and/or indium oxide. The nanoparticles can have any useful size such as, for example, 1 to 100, or 1 to 75, or 5 to 50 nanometers. Incorporation of infrared absorbing nanoparticles does not cause detrimental effects on the visible light transmission, but aids in blocking infrared light from passing through the film.

The tinted layer may also be a tinted film. Tinted films include films in which the tinting agent is incorporated within the film as well as films to which a tinted layer is applied, as described above. Examples of suitable tinting agents include dyes, pigments and light absorbing particles, such as, for example, carbon black particles. An example of suitable tinted films include those described in U.S. Pat. No. 6,811,867 (McGurran et al.).

The tinted layer may also be a tinted glazing substrate. The glazing substrate may be glass or a polymeric material such as polymethyl methacrylate or polycarbonate. Tinted glazing substrates include glazing substrates in which the tinting agent is incorporated within the substrate as well as substrates to which a tinted layer is applied, as described above. Examples of suitable tinting agents include dyes, pigments and light absorbing particles.

In some embodiments, the reflection inhibitor layer is an absorptive polarizer layer. Suitable absorptive polarizer layers include, for example the dichroic polarizing films disclosed in U.S. Pat. No. 6,610,356 (Kausch et al.), and U.S. Pat. No. 6,096,375 (Ouderkirk et al.).

In embodiments where the reflection inhibitor layer is a dichroic absorptive polarizer film, the films may include a polymeric film which contains polyvinyl alcohol and a second polymer or other additive. The polymeric film is oriented and incorporates a dichroic dye material. The dichroic dye material may be incorporated before or after stretching of the film. It has been found that the addition of a second polymer dispersible or soluble in a solvent used in the formation of the polyvinyl alcohol film significantly reduces cracking. The second polymer is included as either a dispersion or a solution, depending on the nature of the second polymer. The second polymer is typically water-soluble, as water is a common solvent for polyvinyl alcohol. Generally, the second polymer is a polar polymer, such as, for example, polyvinyl pyrrolidone and polyesters dispersible in the solvent of the polyvinyl alcohol. Examples of water-soluble or water dispersible polyesters include sulfonated polyesters, such as those describe in U.S. Pat. No. 5,427,835. Suitable co-solvents include, for example, polar solvents such as C1-C4 alcohols.

The reflection inhibitive dichroic absorptive polarizer film typically includes a dichroic dye material. The dichroic dye material may include dyes, pigments, and the like. Suitable dye materials for use in the dichroic polarizer film include, for example, iodine, as well as anthraquinone and azo dyes, such as Congo Red (sodium diphenyl-bis-.alpha.-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). Still other dichroic dyes, and methods of making them, are discussed in the Kirk Othmer Encyclopedia of Chemical Technology, Vol. 8, pp. 652-661 (4th Ed. 1993), and in the references cited therein.

Typically, the absorptive polarization layer has a polarization ratio of less than 0.5:1, wherein the polarization ratio is the ratio of the transmission of linearly polarized light in the horizontal direction to the transmission of linearly polarized light in the vertical direction. In some embodiments, the polarization ratio is less than 0.1:1, or even 0.02:1.

When the absorptive polarizer is used as the reflection inhibitor layer, some care must be taken with the orientation of the two polarizer layers. Orienting of the two polarizer layers in such a way that the horizontal block axes are oriented +90° or −90° of each other will tend to block nearly all visible light from passing through the article. The resulting combination would look like a mirror from the reflective polarizer film side, and appear black from the reflection inhibiting side. Therefore it is generally desirable to orient the two polarizer layers such that their horizontal block axes are oriented within between +20° and −20° of each other.

In some embodiments, the reflective polarizing film article is attached to the glazing substrate by an adhesive layer. Typically, the adhesive is a heat activated adhesive or a pressure sensitive adhesive, more typically a pressure sensitive adhesive. In some embodiments, additional adhesive layers may be present, for example to attach the reflective polarizer layer to the reflection inhibitor layer.

The term "adhesive" as used herein refers to polymeric compositions useful to adhere together two adherends. Examples of adhesives are heat activated adhesives, and pressure sensitive adhesives.

Heat activated adhesives are non-tacky at room temperature but become tacky and capable of bonding to a substrate at elevated temperatures. These adhesives usually have a glass transition temperature ($T_g$) or melting point ($T_m$) above room temperature. When the temperature is elevated above the $T_g$ or $T_m$, the storage modulus usually decreases and the adhesive becomes tacky.

Pressure sensitive adhesive compositions are well known to those of ordinary skill in the art to possess at room temperature properties including the following: (1) aggressive and permanent tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Obtaining the proper balance of properties is not a simple process.

A wide variety of adhesive compositions are suitable. Typically, the adhesive is optically clear. The adhesive component can be any material that has adhesive properties. Additionally, the adhesive component can be a single adhesive or the adhesive can be a combination of two or more adhesives.

Suitable adhesives include, for example, pressure sensitive adhesives such as those based on natural rubbers, synthetic rubbers, styrene block copolymers, polyvinyl ethers, poly (meth)acrylates (including both acrylates and methacrylates), polyolefins, silicones, or heat activated adhesives such as polyvinyl butyral.

The optically clear pressure sensitive adhesives may be (meth)acrylate-based pressure sensitive adhesives. Useful alkyl (meth)acrylates (i.e., acrylic acid alkyl ester monomers) include linear or branched monofunctional unsaturated acrylates or methacrylates of non-tertiary alkyl alcohols, the alkyl groups of which have from 4 to 14 and, in particular, from 4 to 12 carbon atoms. Poly(meth)acrylic pressure sensitive adhesives are derived from, for example, at least one alkyl (meth)acrylate ester monomer such as, for example, isooctyl acrylate, isononyl acrylate, 2-methylbutyl acrylate, 2-ethyl-n-hexyl acrylate and n-butyl acrylate, isobutyl acrylate, hexyl acrylate, n-octyl acrylate, n-octyl methacrylate, n-nonyl acrylate, isoamylacrylate, n-decyl acrylate, isodecyl acrylate, isodecyl methacrylate, isobornyl acrylate, 4-methyl-2-pentyl acrylate and dodecyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, alkyl maleates and alkyl fumarates (based, respectively, on maleic and fumaric acid), or combinations thereof.

In certain embodiments, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition.

In some embodiments, the adhesive layer is at least partially formed of polyvinyl butyral (PVB). The polyvinyl butyral layer may be formed via known aqueous or solvent-based acetalization process in which polyvinyl alcohol is reacted with butyraldehyde in the presence of an acidic catalyst. In some instances, the polyvinyl butyral layer may include or be formed from polyvinyl butyral that is commercially available from Solutia Incorporated, of St. Louis, Mo., under the trade name "BUTVAR" resin.

In some instances, the polyvinyl butyral layer may be produced by mixing resin and (optionally) plasticizer and extruding the mixed formulation through a sheet die. If a plasticizer is included, the polyvinyl butyral resin may include about 20 to 80 or perhaps about 25 to 60 parts of plasticizer per hundred parts of resin. Examples of suitable plasticizers include esters of a polybasic acid or a polyhydric alcohol. Suitable plasticizers are triethylene glycol bis(2-ethylbutyrate), triethylene glycol di-(2-ethylhexanoate), triethylene glycol diheptanoate, tetraethylene glycol diheptanoate, dihexyl adipate, dioctyl adipate, hexyl cyclohexyladipate, mixtures of heptyl and nonyl adipates, diisononyl adipate, heptylnonyl adipate, dibutyl sebacate, polymeric plasticizers such as the oil-modified sebacic alkyds, and mixtures of phosphates and adipates such as disclosed in U.S. Pat. No. 3,841,890 and adipates such as disclosed in U.S. Pat. No. 4,144,217.

The adhesive layer may be crosslinked. The adhesives can be crosslinked by heat, moisture or radiation, forming covalently crosslinked networks which modify the adhesive's flowing capabilities. Crosslinking agents can be added to all types of adhesive formulations but, depending on the coating and processing conditions, curing can be activated by thermal or radiation energy, or by moisture. In cases in which crosslinker addition is undesirable one can crosslink the microstructured adhesive if needed by exposure to an electron beam.

The degree of crosslinking can be controlled to meet specific performance requirements. The adhesive can optionally further comprise one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, and mixtures thereof can be used.

The adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet ("UV") stabilizers, hydrogenated butyl rubber, pigments, curing agents, polymer additives, thickening agents, chain transfer agents and other additives provided that they do not reduce the optical clarity of the adhesive. In some embodiments, the adhesive may contain a UV absorber (UVA). Suitable UVAs include, for example, benzotriazole UVAs such as the compounds available from Ciba, Tarrytown, N.Y. as TINUVIN P, 213, 234, 326, 327, 328, 405 and 571.

Also disclosed herein are glazing units. These glazing units comprise at least one glazing substrate, at least one reflective polarizing film, and at least one reflection inhibitor layer. The reflective polarizing film reduces transmission of polarized light with a polarization block axis that is horizontal, and reduces the horizontally polarized light to 90% or less of the horizontally polarized incident visible light. In these glazing units, the glazing substrate, the reflective polarizing film, and the reflection inhibitor layer are all as described above.

These glazing units are different from the articles described above in that the reflective polarizing film, and the reflection inhibitor layer and glazing substrate may be separate articles in the glazing unit. As such, these separate articles can be arranged in any sequence relative to each other and can have spaces or intervening layers between them. For example, the reflective polarizer can be attached to the inside surface of the first pane of a double layer glazing article, and the reflection inhibitor layer can be attached to the inside surface of the second pane of a double layer glazing article, with an air or vacuum space between the two panes.

In some embodiments, the glazing substrate, the reflective polarizing film, and reflection inhibitor layer are not in contact with each other. In these embodiments, each of the layers are of sufficient strength and rigidity to form free-standing layers. The spaces in between may be filled with air or other gases or vacuum.

In other embodiments, the reflective polarizing film, and the reflection inhibitor layer are in contact with each other to form a reflective polarizing film article, and this reflective polarizing film article is not in contact with the glazing substrate.

Several embodiments of this disclosure are described by the figures. FIG. 1 shows a cross sectional view of glazing article 100, an exemplary embodiment of this disclosure. Glazing article 100 comprises glazing substrate 110 with reflective polarizing film article 120 attached. Reflective polarizing film article 120 comprises reflective polarizing film 130 and reflection inhibiting layer 140. The glazing article also has optional frame pieces 150. The glazing article may be, for example, a window. The glazing article may be part of a structure such as a room or a building, or part of a vehicle such as an automobile, a train, a bus, an airplane, a boat, etc.

Figure 2:
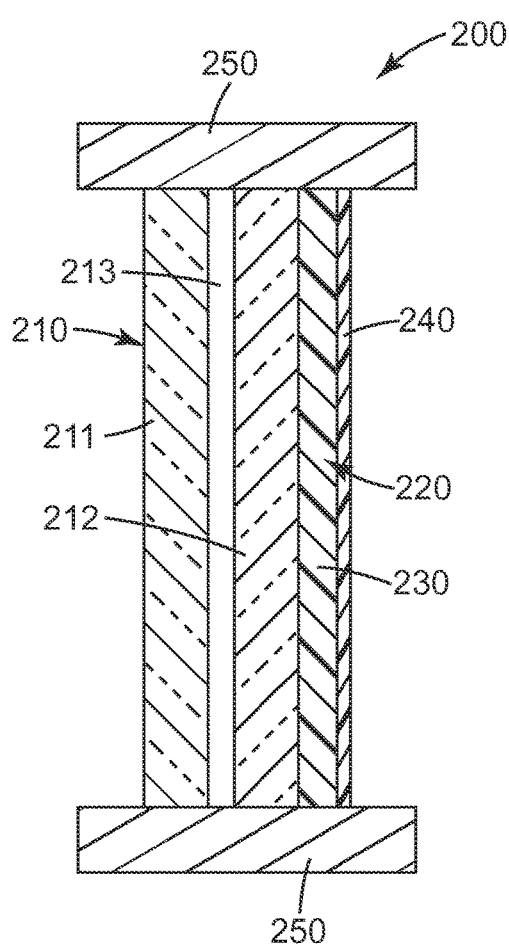
FIG. 2 shows a cross sectional view of a glazing article of this disclosure.

FIG. 2 shows a cross sectional view of a different glazing article 200, an exemplary embodiment of this disclosure. Glazing article 200 comprises double pane glazing substrate 210 with reflective polarizing film article 220 attached. The double pane glazing substrate comprises two panes 211 and 212 with void 213 between the two panes. Void 213 may be a vacuum space or may be filled with air or other gas. Reflective polarizing film article 220 comprises reflective polarizing film 230 and reflection inhibiting layer 240. The glazing article also has optional frame pieces 250. The glazing article may be, for example, a window.

Figure 3:
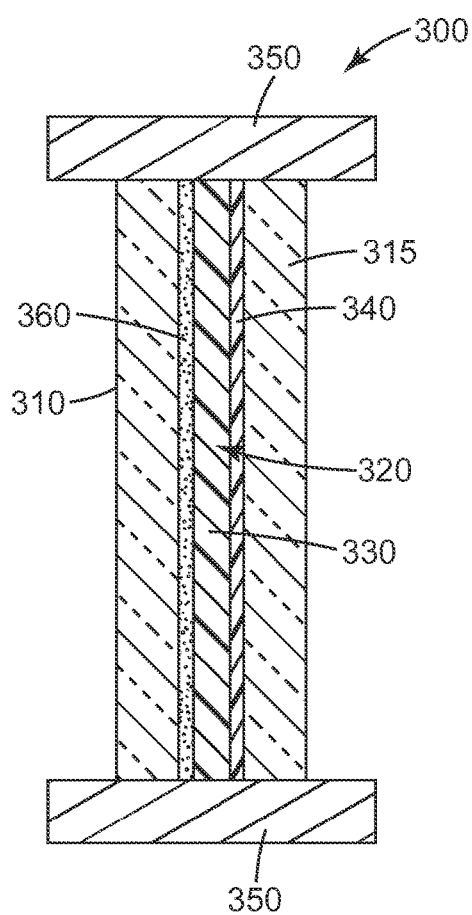
FIG. 3 shows a cross sectional view of a glazing article of this disclosure.

FIG. 3 shows a cross sectional view of a different double pane glazing article 300, an exemplary embodiment of this disclosure. Glazing article 300 comprises double pane glazing substrate with panes 310 and 315 and with reflective polarizing film article 320 sandwiched between the two panes. Reflective polarizing film article 320 comprises reflective polarizing film 330 and reflection inhibiting layer 340 and is attached to pane 310 by optional adhesive layer 360. The reflective polarizing film article 320 may also be optionally attached to pane 315 by an adhesive layer (not shown). The glazing article also has optional frame pieces 350. The glazing article may be, for example, a window.

Figure 4:
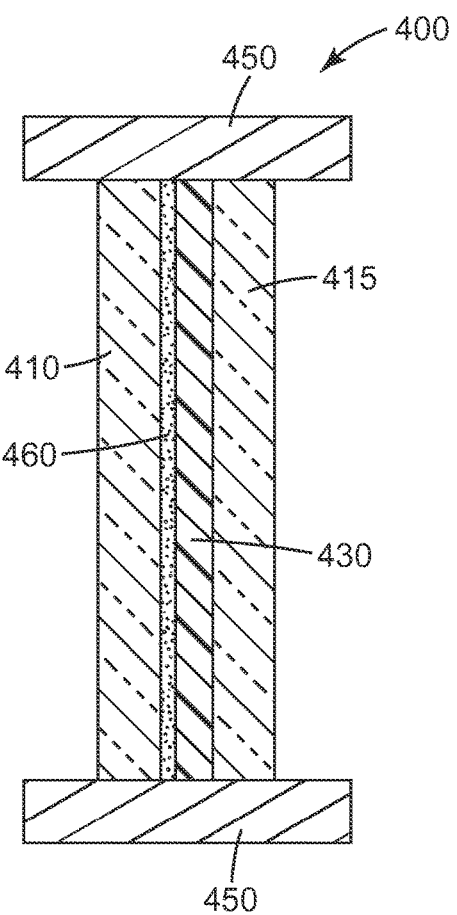
FIG. 4 shows a cross sectional view of a glazing article of this disclosure.

FIG. 4 shows a cross sectional view of a different double pane glazing article 400, an exemplary embodiment of this disclosure. Glazing article 400 comprises double pane glazing substrate with panes 410 and tinted pane 415 and with reflective polarizing film 430 sandwiched between the two panes. Tinted pane 415 may be a tinted glazing substrate or may contain a tinted coating or film, as described above. Reflective polarizing film 430 is attached to pane 410 by optional adhesive layer 460. The reflective polarizing film 430 may also be optionally attached to pane 415 by an adhesive layer (not shown). Reflective polarizing film 430 and tinted pane 415 together may be considered a reflective polarizing film article. The glazing article also has optional frame pieces 450. The glazing article may be, for example, a window.

FIG. 5 shows a cross sectional view of a different double pane glazing article 500, an exemplary embodiment of this disclosure. Glazing article 500 comprises double pane glazing substrate with panes 510 and tinted pane 515 and with reflective polarizing film 530 located between the two panes. Tinted pane 515 may be a tinted glazing substrate or may contain a tinted coating or film, as described above. Reflective polarizing film 530 is attached to pane 510 by optional adhesive layer 560. Void space 570 is present between reflective polarizing film 530 and tinted pane 515. Void 570 may be a vacuum space or may be filled with air or other gas. The glazing article also has optional frame pieces 550. The glazing article may be, for example, a window.

FIG. 6 shows a cross sectional view of a different double pane glazing article 600, an exemplary embodiment of this disclosure. Glazing article 600 comprises double pane glazing substrate with panes 610 and tinted pane 615 and with reflective polarizing film 630 located between the two panes. Tinted pane 615 may be a tinted glazing substrate or may contain a tinted coating or film, as described above. Void space 670 is present between reflective polarizing film 630 and pane 610. Void space 675 is present between reflective polarizing film 630 and tinted pane 615. Voids 670 and 675 may independently be a vacuum space or may be filled with air or other gas. The glazing article also has optional frame pieces 650. The glazing article may be, for example, a window.

Figure 7:
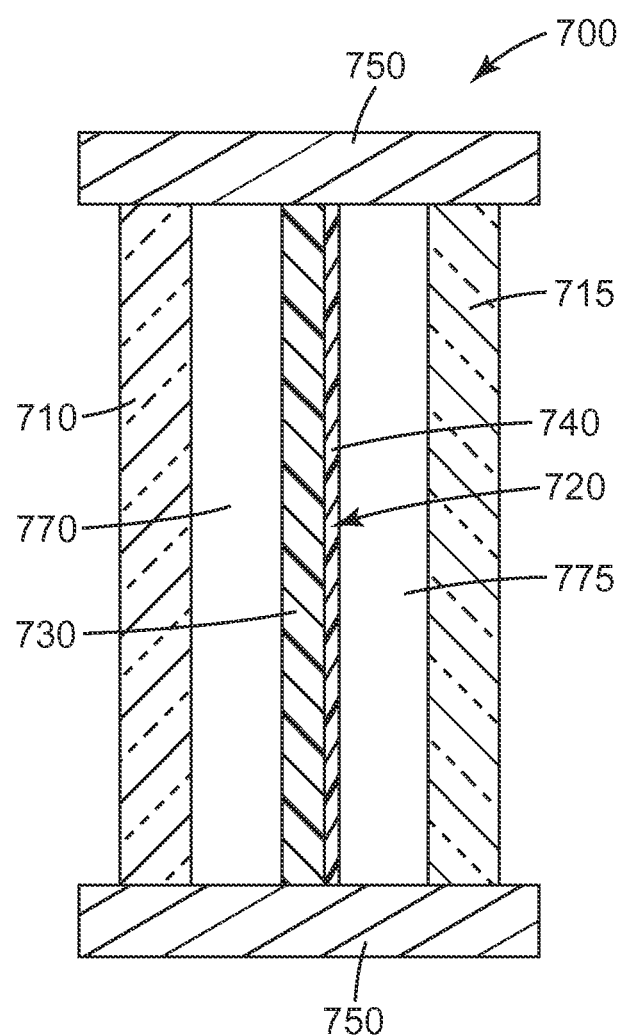
FIG. 7 shows a cross sectional view of a glazing article of this disclosure.

FIG. 7 shows a cross sectional view of a different double pane glazing article 700, an exemplary embodiment of this disclosure. Glazing article 700 comprises double pane glazing substrate with panes 710 and 715 and with reflective polarizing film article 720 located between the two panes. Void space 770 is present between reflective polarizing film article 720 and pane 710. Void space 775 is present between reflective polarizing film article 720 and tinted pane 715. Voids 770 and 775 may independently be a vacuum space or may be filled with air or other gas. Reflective polarizing film article 720 comprises reflective polarizing film 730 and reflection inhibiting layer 740. The glazing article also has optional frame pieces 750. The glazing article may be, for example, a window.

The present disclosure includes the following embodiments.

Among the embodiments are glazing articles. A first embodiment includes an article comprising a glazing substrate; and a reflective polarizing film article attached to the glazing substrate, wherein the reflective polarizing film article comprises: a reflective polarizing film; and a reflection inhibitor layer, wherein the reflective polarizing film article reduces transmission of polarized light with a polarization block axis that is horizontal, and wherein the reflective polarizing film article reduces the horizontally polarized light to 90% or less of the horizontally polarized incident visible light.

Embodiment 2 is the article of embodiment 1, wherein the reflecting polarizing film comprises a multi-layer construction.

Embodiment 3 is the article of embodiment 2, wherein the multi-layer construction comprises a multi-layer film.

Embodiment 4 is the article of any of embodiments 1-3, wherein the reflection inhibitor layer comprises a tinted layer.

Embodiment 5 is the article of embodiment 4, wherein the tinted layer comprises a coating, a film, or a tinted glazing substrate.

Embodiment 6 is the article of embodiment 4, wherein the tinted layer comprises a coating, the coating comprising a layer of visible light absorbing particles in a cured polymeric binder, or a combination of visible light absorbing particles and infrared light absorbing particles in a cured polymeric binder.

Embodiment 7 is the article of embodiment 4, wherein the tinted layer comprises a tinted hardcoat layer.

Embodiment 8 is the article of embodiment 7, wherein the tinted hardcoat layer comprises carbon black particles in a cured acrylic binder.

Embodiment 9 is the article of any of embodiments 1-8, wherein the reflection inhibitor layer comprises an absorptive polarizer layer.

Embodiment 10 is the article of embodiment 9, wherein the absorptive polarization layer has a polarization ratio of less than 0.5:1, wherein the polarization ratio is the ratio of the transmission of linearly polarized light in the horizontal direction to the transmission of linearly polarized light in the vertical direction.

Embodiment 11 is the article of embodiment 10, wherein the absorptive polarization layer has a polarization ratio of less than 0.1:1.

Embodiment 12 is the article of embodiment 10, wherein the absorptive polarization layer has a polarization ratio of less than 0.02:1.

Embodiment 13 is the article of embodiment 9, wherein the absorptive polarizer layer and the multi-layer reflecting polarizing film have horizontal block axes that are oriented within between +20° and −20° of each other.

Embodiment 14 is the article of embodiment 3, wherein the multi-layer reflective polarizing film comprises at least two oriented polyester film layers selected from polyethylene terephthalate (PET), copolymers containing polyethylene terephthalate (CoPET), polyethylene naphthalate (PEN), copolymers containing polyethylene naphthalate (CoPEN), or combinations thereof.

Embodiment 15 is the article of any of embodiments 1-14, wherein the article has a visible light % transmission of from 5% to 50%.

Embodiment 16 is the article of any of embodiments 1-15, wherein the reflective polarizing film article is attached to the glazing substrate by a pressure sensitive adhesive layer.

Embodiment 17 is the article of any of embodiments 1-16, wherein the reflective polarizing film article reduces transmission of horizontally polarized light to 60% or less of the horizontally polarized incident visible light.

Embodiment 18 is the article of any of embodiments 1-17, wherein the reflective polarizing film article reduces transmission of horizontally polarized light to 20% or less of the horizontally polarized incident visible light.

Embodiment 19 is the article of any of embodiments 1-18, wherein the reflection of unpolarized visible light incident on the surface of the reflection inhibitor layer is less than 30%.

Embodiment 20 is the article of any of embodiments 1-19, wherein the reflection of unpolarized visible light incident on the surface of the reflection inhibitor layer is less than 10%.

Embodiment 21 is the article of any of embodiments 1-20, wherein the reflection of unpolarized visible light incident on the surface of the reflective polarizing film layer is at least 20%.

Embodiment 22 is the article of any of embodiments 1-21, wherein the reflection of unpolarized visible light incident on the surface of the reflective polarizing film layer is at least 40%.

Also among the embodiments are glazing units. Embodiment 23 includes a glazing unit comprising: at least one glazing substrate; at least one reflective polarizing film; and at least one reflection inhibitor layer, wherein the reflective polarizing film reduces transmission of polarized light with a polarization block axis that is horizontal, and wherein the reflective polarizing film reduces the horizontally polarized light to 90% or less of the horizontally polarized incident visible light.

Embodiment 24 is the glazing unit of embodiment 23, wherein the at least one glazing substrate, the at least one reflective polarizing film, and the at least one reflection inhibitor layer are not in contact with each other.

Embodiment 25 is the glazing unit of embodiment 23, wherein the at least one reflective polarizing film, and the at least one reflection inhibitor layer are in contact with each other to form a reflective polarizing film article, and this reflective polarizing film article is not in contact with the at least one glazing substrate.

Embodiment 26 is the glazing unit of any of embodiments 23-25, wherein the reflection inhibitor layer comprises a tinted layer or an absorptive polarizer layer.

Embodiment 27 is the glazing unit of any of embodiments 23-26, further comprising a second glazing substrate.

Embodiment 28 is the article of embodiment 6, wherein the infrared light absorbing particles comprise metal oxide nanoparticles Embodiment 29 is the article of embodiment 28, wherein the metal oxide nanoparticles comprise tin, antimony, indium and zinc oxides or doped oxides.

EXAMPLES

These examples are merely for illustrative purposes only and are not meant to be limiting on the scope of the appended claims. All parts, percentages, ratios, etc. in the examples and the rest of the specification are by weight, unless noted otherwise. These abbreviations are used in the following examples: g=grams, min=minutes, hr=hour, sec=second, mL=milliliter, L=liter, s=seconds, fps=feet per second, mJ=milli Joules, in=inch; cm=centimeter; mm=millimeter; mil=one thousandth of an inch; μm=micrometer; cps=centiPoise. Solvents and other reagents used were obtained from Sigma-Aldrich Chemical Company; Milwaukee, Wis. unless otherwise noted.

Test Methods:

Interior Glare Reduction Test:

A square box with a 12 in×12 in (30.5×30.5 cm) cross section was used to carry out the test. The total length of the box is 34 in (61.0 cm) long. A glossy white surface was constructed by laminating a white piece of PET film onto a 3 mm thick, 11 in×11 in (27.9×27.9 cm) glass plate. The exposed glass surface faced upward. The glass plate was placed in the test box bottom surface. A window glass plate sample was placed vertically in front of the glossy white surface plate. A light source with a 1 cm fiber optic cable attachment (Fostec Inc) was constructed using a collimated light source with a 12 mm diameter. The light source was placed approximately 12 in (30.5 cm) away from the window glass plate. The arrangement was such that the light source beam first passes the window glass plate, then it struck the glossy white surface. The light source output direction was such that the light beam struck the glossy white surface at approximately 60° from surface normal, i.e. with a 60° incident angle. A light luminance meter, commercially available from Konica-Minolta (Tokyo, Japan) under the trade designation "LS-100 Luminance Meter", was used to measure the brightness in cd/m² at the center of the diffuse spot on the glossy white surface from the opposite side of the glossy white surface. The measurement angle was at approximately 60° from normal to the glossy white surface. The brightness was recorded for selected window glazing orientations, i.e. 0° and 45°. 45° orientation was selected because it was equivalent in transmission to a neutral density non-polarizing glazing (comparative example). The glare reduction % was calculated using the equation: Glare % Reduction=$(L_{45}-L_0)/L_{45\times100}$%, whereas the $L_{45}$ is the brightness at 45° orientation and $L_0$ is the brightness at 0° orientation. The results are summarized in Table 1.

A detailed illustration of glare reduction was done by rotating the polarized window glazing from 0° to 45° at 5° intervals. The glare reduction at orientation angle a was calculated using the equation: Glare % Reduction=$(L_{45}-L_a)/L_{45\times100}$% whereas the $L_{45}$ is the brightness at 45 degree orientation and $L_a$ is the brightness at orientation angle a. The results are summarized in Table 2.

Exterior Glare Reduction Test:

This test was run identically to the "Interior Glare Reduction Test" except that the arrangement was such that the light source beam strikes the glossy white surface first and then passes through the window glass plate before reaching the luminance detector.

Reflectance, Transmission and Absorption

Reflectance and transmission were measured using a Perkin-Elmer Lambda 1050 Spectrometer. Raw spectral files were processed using the LBNL (Lawrence Berkeley National Laboratory) Optics 5.1 program to generate reflectivity, transmission and absorption values.

Comparative Example 1 (CE1)

Comparative example 1 was made according to U.S. Pat. No. 7,740,470. Reflectance, transmission and absorption measurements are shown in Table 3. Side 2 is defined as the reflection inhibiting layer side and Side 2 is defined as the opposite side.

Comparative Example 2 (CE2)

The reflective polarizer used was very similar to example 1 of U.S. Pat. No. 6,296,927. The same substrate film was used in examples 2-6. Reflectance, transmission and absorption measurements are shown in Table 3.

Comparative Example 3 (CE3)

A "HLC2-5618 Super High Contrast Bluish Gray Absorbing Polarizer" from Sanritz, Tokyo, Japan was laminated onto a 3 mm clear glass for testing purposes. Reflectance, transmission and absorption measurements are shown in Table 3. Reflectance from the absorbing polarizer side of the laminate is $R_{vis}$ Side 2. Reflectance from the glass side of the laminate is $R_{vis}$ Side 1.

Example 1 (EX1)

The reflective polarizer of Comparative Example 1 was laminated onto 3 mm glass with an optically clear PSA (pressure sensitive adhesive). The absorbing polarizer of Comparative Example 3 was laminated onto the reflective polarizer so that the polarization pass axes of both reflective and absorbing polarizers were aligned parallel to one another. The entire assembly was tested and reflectance, transmission and absorption measurements are shown in Table 3.

Example 2-6 (EX2-EX6)

A coating line with a slot coating die with an 8 in (20 cm) width and a 4 mil (1 mm) thick shim was used to prepare these examples. The multilayer reflective polarizer film of Comparative Example 2 was used as the substrate film. A two-pass process was used to put a pressure sensitive adhesive layer on one side of the substrate and a reflection inhibiting layer on the opposite side of the substrate. During the first pass, the substrate film was subjected to corona treatment at 250 mJ/cm$^2$ before it passed the die lip. The line speed was set at 40 fpm (20 cm/sec). A 20% solids, solvent borne, 1000 cps, acrylic optically clear pressure sensitive adhesive was pumped through the die and coated on the multilayer reflective polarizer film substrate (3-6 mils wet coat, 600-1200 mg/ft$^2$ dry weight). The coated film was subjected to drying in a 3 zone oven. The zone temperatures were 180° F. (82° C.), 190° F. (88° C.), and 200° F. (93° C.) for zones 1, 2 and 3 respectively. The solution pump rate was adjusted so that the final coating thickness is about 2 mil thick (51 µm). After drying, the coated film was laminated to a 0.92 mil (23 µm) PET (polyethylene terephthalate) silicone liner using a laminator at room temp and wound up on an output roll. The output roll was used as the input substrate for the two pass process. The uncoated surface of the substrate film was subjected to corona treatment at 250 mJ/cm$^2$ before it passed the die lip. The line speed was set at 40 fpm (20 cm/sec). An acrylic hardcoat solution (20 cps, 40% solids, functioning as a reflection inhibiting layer) was pumped through the die and coated on the reflective polarizer film substrate. The acrylic hardcoat solution was made by combining 163.5 g of a 1:1 blend of 1.6 hexanediol diacrylate:pentaerythritol triacrylate, 90.8 g propylene glycol monomethyl ether, 133.3 g methyl ethyl ketone, 1.6 g "IRGACURE 819" commercially available from BASF, Florham Park, N.J., 64.4 g carbon black dispersed in nitrocellulose resin and solvent commercially available under the trade designation "6B380" from Penn Color Inc. of Doyleston, Pa. and 0.07 g silicone polyether acrylate commercially available under the trade designation "TEGO RAD 2250" from Evonik Tego Chemie, Essen, Germany. The coated film had a wet thickness of 0.5-1.0 mil (13-25 µm). The coated film was subjected to drying in a 3-zone oven. The zone temperatures were 140° F. (64° C.), 160° F. (73° C.), and 180° F. (82° C.) for zone 1, 2 and 3 respectively. After drying, the coated film was UV cured with a Fusion H bulb at 60%-100% output. The solution pump rate was adjusted so that the final dry coating thickness was about 1.7 µm (Example 2), 2.4 µm (Example 3), 3.5 µm (Example 4), 5.1 µm (Example 5), and 6.7 µm (Example 6). The output film was wound up in an output roll.

The output films were laminated to a 3 mm single pane glass to form a finished glazing. For example 5, polarizer film was oriented at different angles and glare reduction measured as shown in Tables 1 and 2. Reflectance, transmittance and absorbance measurements for examples 2-6 are shown in Table 3.

TABLE 1

| Example 5 | $L_0$ (cd/m$^2$) | $L_{45}$ (cd/m$^2$) | Glare Reduction (%) |
|---|---|---|---|
| Exterior Surface Glare Reflectance | 7030 | 64400 | 89% |
| Interior Surface Glare Reflectance | 4765 | 44700 | 89% |

TABLE 2

| Example 5 Polarizer Film Orientation Angle | Brightness (cd/m²) | % Glare Reduction |
|---|---|---|
| 45° | 1600 | 0% |
| 40° | 1300 | 19% |
| 35° | 1095 | 32% |
| 30° | 934.5 | 42% |
| 25° | 756.5 | 53% |
| 20° | 626.2 | 61% |
| 15° | 399.8 | 75% |
| 10° | 321.9 | 80% |
| 5° | 281.7 | 82% |
| 0° | 263.1 | 84% |

TABLE 3

| Film | Tvis | Tsolar | Rvis Side 1 | Rvis Side 2 | Abs |
|---|---|---|---|---|---|
| CE1 | 0.450 | 0.590 | 0.527 | 0.541 | 0.012 |
| CE2 | 0.467 | 0.5588 | 0.5158 | 0.5308 | 0.1104 |
| CE3 | 0.434 | 0.579 | 0.061 | 0.056 | 0.358 |
| EX1 | 0.400 | 0.543 | 0.556 | 0.082 | 0.079 |
| EX 2 | 0.397 | 0.5011 | 0.5019 | 0.2057 | 0.1800 |
| EX3 | 0.252 | 0.3729 | 0.5013 | 0.1758 | 0.3094 |
| EX4 | 0.1903 | 0.3143 | 0.4996 | 0.1189 | 0.3682 |
| EX5 | 0.1320 | 0.2519 | 0.4965 | 0.0813 | 0.4348 |
| EX6 | 0.0913 | 0.2045 | 0.5016 | 0.0630 | 0.4784 |

Tvis = visible light transmission (400-700 nm)
Tsolar = solar heat transmission measured as a fraction of the 350-2500 nm radiation actually transmitted through a 6 mm single pane glass with the specific film attached, except for CE1, CE3, and EX1 in which 3 mm single pane glass was used.
Abs = absorption through a 6 mm single pane glass with the specific film attached.
Rvis Side 1 = reflectance of visible light from side 1
Rvis Side 2 = reflectance of visible light from side 2.

What is claimed is:

1. An article consisting essentially of:
    a window consisting essentially of:
        a glazing substrate; and
        a reflective polarizing film article attached to the glazing substrate, wherein the reflective polarizing film article consists essentially of:
            a visible light reflective polarizing film; and
            a visible light reflection inhibitor layer comprising a tinted layer, wherein the tinted layer comprises a coating, a film, or a tinted glazing substrate, and
            wherein the reflection inhibitor layer inhibits light reflected from the reflective polarizing film, wherein the reflective polarizing film article reduces glare, which is horizontally polarized sunlight, including sunlight reflected off of horizontal surfaces and Rayleigh scattered sunlight, and
        wherein the reflective polarizing film article reduces the transmission of horizontally polarized light to 90% or less of incident horizontally polarized visible light.

2. The article of claim 1, wherein the reflective polarizing film comprises a multi-layer construction.

3. The article of claim 2, wherein the multi-layer construction comprises a multi-layer film.

4. The article of claim 1, wherein the tinted layer comprises a coating, the coating comprising a layer of visible light absorbing particles in a cured polymeric binder, or a combination of visible light absorbing particles and infrared light absorbing particles in a cured polymeric binder.

5. The article of claim 1, wherein the tinted layer comprises a tinted hardcoat layer.

6. The article of claim 5, wherein the tinted hardcoat layer comprises carbon black particles in a cured acrylic binder.

7. The article of claim 3, wherein the multi-layer reflective polarizing film comprises at least two oriented polyester layers selected from polyethylene terephthalate (PET), copolymers containing polyethylene terephthalate (CoPET), polyethylene naphthalate (PEN), copolymers containing polyethylene naphthalate (CoPEN), or combinations thereof.

8. The article of claim 1, wherein the article has a visible light transmission of from 5% to 50%.

9. The article of claim 1, wherein the reflective polarizing film article reduces transmission of horizontally polarized light to 60% or less of incident horizontally polarized visible light.

10. The article of claim 1, wherein a reflection of unpolarized visible light incident on the surface of the reflection inhibitor layer is less than 30%.

11. The article of claim 1, wherein a reflection of unpolarized visible light incident on the surface of the reflective polarizing film layer is at least 20%.

12. A glazing unit consisting essentially of:
    a window consisting essentially of:
        a glazing substrate;
        a visible light reflective polarizing film; and
        a visible light reflection inhibitor layer wherein the visible light reflection inhibitor layer comprises a tinted layer, and
        wherein the visible light reflection inhibitor layer inhibits light reflected from the visible light reflective polarizing film, wherein the visible light reflective polarizing film reduces transmission of glare, which is horizontally polarized sunlight, including sunlight reflected off of horizontal surfaces and Rayleigh scattered sunlight, and wherein the visible light reflective polarizing film reduces the transmission of horizontally polarized light to 90% or less of incident horizontally polarized visible light.

13. The glazing unit of claim 12, wherein the glazing substrate, the reflective polarizing film, and the reflection inhibitor layer are not in contact with each other.

14. The glazing unit of claim 12, wherein the reflective polarizing film, and the reflection inhibitor layer are in contact with each other to form a reflective polarizing film article, and this reflective polarizing film article is not in contact with the at least one glazing substrate.

* * * * *